Dec. 1, 1925.                                            1,563,994
P. KAMINSKI
SYSTEM FOR ADJUSTING DEVICES AT A DISTANCE
Filed Jan. 24, 1921
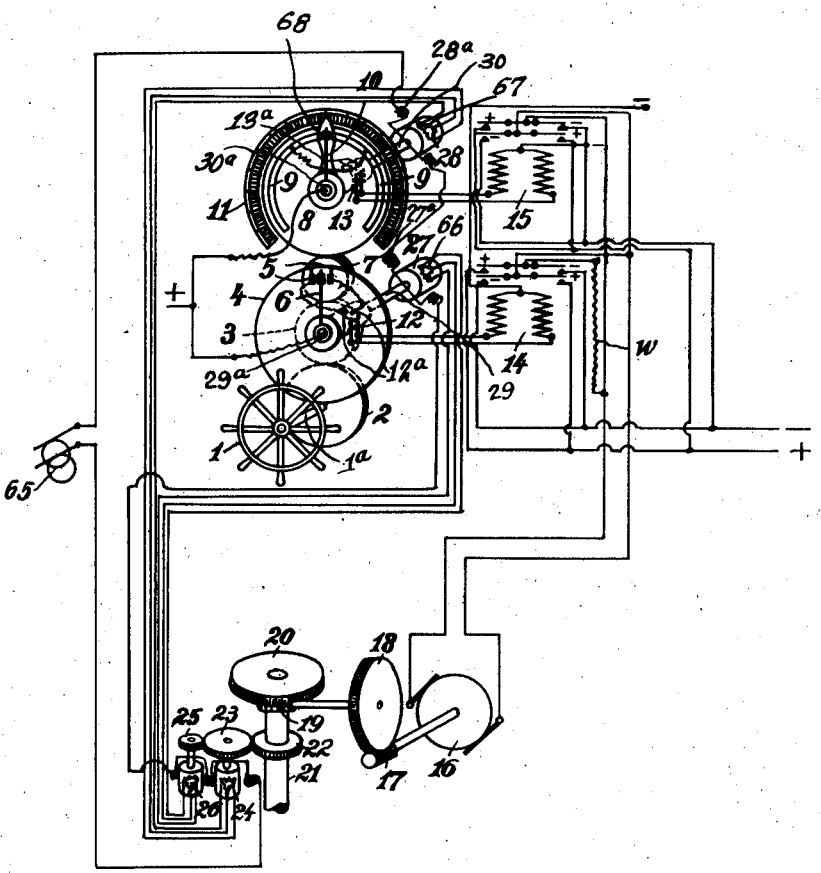
Inventor
Paul Kaminski
by Knight Bro
  attorneys Patented Dec. 1, 1925.

1,563,994

UNITED STATES PATENT OFFICE.

PAUL KAMINSKI, OF BERLIN-PANKOW, GERMANY, ASSIGNOR TO SIEMENS & HALSKE AKTIENGESELLSCHAFT, OF SIEMENSSTADT, NEAR BERLIN, GERMANY, A GERMAN CORPORATION.

SYSTEM FOR ADJUSTING DEVICES AT A DISTANCE.

Application filed January 24, 1921. Serial No. 439,650.

*To all whom it may concern:*

Be it known that I, PAUL KAMINSKI, a citizen of the German Empire, residing at Berlin-Pankow, Germany, have invented certain new and useful Improvements in Systems for Adjusting Devices at a Distance (for which I have filed an application in Germany on February 12, 1919, Serial No. 49,605 VIII/21 C 2), of which the following is a specification.

In the systems for adjusting devices at a distance by means of electrically operated transmitters and receivers the particular adjustment desired at any moment is obtained by setting an index so that it points to a certain graduation of a scale of the transmitter and produces a corresponding effect on the receiver. The receiver is thus caused to actuate a contact device and to directly or indirectly (as by relays or similar devices) affect the driving motor of the controlled device to be moved into a certain position. With these known systems a signal which indicates that the desired adjustment of the controlled device has been properly effected may only be given by means of a separate signaling system.

The object of this invention is to provide means at the operating station for hand controlling a contact closing device located at the station for controlling the distant driving motor, and to provide a transmitter located adjacent to and actuated by the adjusted object, for operating a receiver at the operating station for controlling the contact opening of said contact device and for indicating, at the same time, the position of the object as adjusted by the motor.

The invention involves the advantage that it becomes unnecessary to employ the distant control means for closing any contacts of the motor control contact device, the said means being now only required to open these contacts which does not consume much energy. It becomes also unnecessary to provide a separate system for transmitting a return signal from the adjusted device to the operating station.

One of the most important features of my invention is that by my novel arrangement I avoid a plurality of contact devices or groups thereof scattered over the entire system and thus removed from the observation by the operator, which, as practice has proven, is one of the main causes of defects in telecontrol systems. As will be observed from the following description, all contact devices are located at the control station so that only the return control transmitter, which has no contacts, remains at the distant station.

My invention is illustrated diagrammatically in the drawing, in which a system having a distant-controlled motor-driven device is diagrammatically illustrated. My novel arrangement is specifically shown as applied to the operation of a ship's rudder without, however, limiting the invention to that particular class of distant-controlled objects.

As shown in the diagram, the electric telecontrol is actuated by means of two electrical systems by which the accuracy of adjustment is increased, one of said systems, the so-called coarse system, adjusting the object to be controlled at a high speed to the approximate setting, and the other one, the so-called fine system, performing the exact adjustment at a slower speed. Electric distant control systems of this character in general are described for instance in the U. S. Patent 1,123,067 granted to me on December 29th, 1914.

Referring to the present drawing, the steering wheel 1 is fixed to a shaft $1^a$ rotatably mounted in the apparatus casing (not shown) and carries on the other end the gear wheel 2. This gear wheel 2 is in mesh with gear wheel 3, loosely mounted on a hollow shaft 29 mounted in the apparatus casing. Gear wheel 3 is fixed to the disc 4 carrying at its periphery the two contacts 5. These contacts are connected each to one slip ring $12^a$, both of which are fixed to disc 4. On these rings two brushes 12 slide which, in turn, are connected over double relay 14 to the minus pole of a suitable source of current (not shown) for instance the supply system of the ship.

Gear wheel 3 rotates through idle gear wheel 7, the toothed disc 8 being provided with two insulated contact segments 9. Disc 8 is rotatably mounted on a hollow shaft 30 fixed in the casing. The contact segments 9 are connected each to one of the two slip rings 13$^a$ rotatable with disc 8. The two brushes 13, sliding on slip rings 13$^a$, are connected over double relay 15 to the minus pole of the aforementioned source of current. In hollow shafts 29 and 30 are disposed shafts 29$^a$ and 30$^a$ respectively on which the rotors 27 and 28 of the electrical receivers 66, 67 are mounted. For the operation of these receivers by the transmitters 24, 26, to be referred to hereinafter, I prefer to use the three phase system such as is described in my copending application Serial No. 468,966, filed May 12th, 1921. Shaft 29$^a$ carries on its free end aforementioned contact pointer 6 and shaft 30$^a$ carries pointer 10, both elements being disposed to pass over their respective discs 4 and 8. The position of these pointers may be read on scales mounted on the apparatus casing. In the drawing, I have shown only scale 11 for the pointer 10 of the coarse receiver 67.

Pointer 10 is provided with a contact 68, disposed to slide over one or the other of the contact segments 9 of the disc 8. Contact 68 is further connected through pointer 10 and central shaft 30$^a$ to the plus pole of aforesaid source of current.

If wheel 1 is turned by hand, the discs 4 and 8 will rotate and the contacts of the discs will engage the contacts of the pointers according to the direction of rotation. Let us assume first that steering wheel 1 is rotated only slightly so that the right hand contact 5 comes in contact with the pointer 6. Pointer 6 being connected to the + pole of the aforesaid source of current, a circuit is established from + pole 6, right contact 5, right slip ring 12$^a$, right brush 12, left hand winding of relay 14 to − pole. The left hand winding of relay 14 will attract the left armature and a circuit is closed for the motor 16 from the + pole of the source of current, upper left contact of relay 14, resistance W, left hand brush of motor 16, right hand brush and the inner left contact of relay 14 to − pole. As the field of the motor 16 is assumed to be constantly energized from the aforesaid current source this motor now will rotate in one certain direction. On the other hand, when the left hand contact 5 makes contact with the pointer 6 the right hand winding of relay 14 will be energized, its right hand armature will be attracted and, therefore, the motor 16 will rotate in the opposite direction. In both cases, the resistance W will cause the motor to operate on a small amount of energy and thus at low speed in making the fine adjustment.

By operating the steering wheel 1 for a larger amount, the pointer 10, being connected to the + pole of the source of current, will now make contact with one of the insulated contact segments 9. Let us assume that pointer 10 is turned in a clockwise direction. Now a circuit is established from + pole 10, right contact segment 9, right brush 13, left hand winding of relay 15 to − pole. The relay 15 will attract its left armature and, therefore, a new circuit is closed for the motor 16 from + pole, upper left contact of relay 15, left brush of the motor 16, right brush, inner left contact of relay 15 to − pole.

Since resistance W is not in that circuit, the motor 16 now will rotate at full speed and power to make the coarse adjustment, in the present example turning the rudder post 21 through gearing 17, 18, 19, 20.

To shaft 21 is fixed a gear wheel 22 which meshes with gear wheel 23 of the rotor of the coarse transmitter 24. The stators of the transmitters 24, 26 and of the receivers 67, 66 are all connected in series with a source of alternating current 65. The movement of the rotor of transmitter 24 is transmitted by the three phase system shown in my aforesaid application to the rotor 28 of the receiver 67 of the coarse system working synchronously with the transmitter 24. Therefore the pointer 10 will follow the disc 8 and the contact of the pointer will slide from the contact segment 9. The circuit of the relay R$_{15}$ is thus opened and the relay armature will drop. This opens the contacts controlled by that relay armature and thus stops the current supply to motor 16 for the coarse adjustment which is then accomplished.

The contact pointer 6 of the fine adjustment, however, is still making contact with one of the contacts 5. Therefore, the corresponding winding of relay 14 remains energized, and the motor 16 will continue its operation, however at a lower speed. When the object to be controlled, in this case shaft 21, has reached the desired point of adjustment, the rotor of the sender 26, geared at a suitable ratio to transmitter 23 and working synchronously with the rotor 27 of the receiver 66 has disconnected the pointer 6 from the respective contact 5 of the disc 4. The attracted armature of the relay 14, therefore, will drop, and the motor 16 will stop altogether.

I claim:

In a system of electric telecontrol of objects the combination of a plurality of contact devices all located at a control station and each of them consisting of a disk provided with two insulated contacts and of a contact pointer, hand-operated means for rotating the disk of each of said contact devices, a plurality of contact relays each of them energized by one of said contact devices, a single motor for adjusting the object to be controlled, and means controlled by the different contact relays, whereby the feeding circuit to the motor is variably controlled to control its speed and direction of rotation, a plurality of transmitters for coarse and fine adjustment actuated by the controlled object, and a plurality of corresponding receivers connected to said transmitters, each of said receivers rotating the pointer of one of said contact devices.

In testimony whereof I affix my signature.

PAUL KAMINSKI.